United States Patent
Park

(12) 
(10) Patent No.: US 6,275,334 B1
(45) Date of Patent: Aug. 14, 2001

(54) PROJECTOR SCREEN HAVING AN IMPROVED HORIZONTAL VIEW ANGLE

(75) Inventor: Jong-bae Park, Suwon (KR)

(73) Assignee: Samsung Electronic Co., Ltd., Kyungki-do (KR)

( * ) Notice: Subject to any disclaimer, the term of this patent is extended or adjusted under 35 U.S.C. 154(b) by 948 days.

(21) Appl. No.: 08/523,809

(22) Filed: Sep. 5, 1995

(30) Foreign Application Priority Data

Nov. 25, 1994 (KR) .................................................. 94-31224

(51) Int. Cl.[7] ............................ G03B 21/56; G03B 21/60
(52) U.S. Cl. ............................................. 359/449; 359/457
(58) Field of Search ........................... 359/443, 452–453, 359/455–457, 460, 449

(56) References Cited

U.S. PATENT DOCUMENTS

| | | | | |
|---|---|---|---|---|
| 3,523,717 | * | 8/1970 | Glenn, Jr. ........................... | 359/449 |
| 4,666,248 | * | 5/1987 | van de Ven ........................ | 359/457 |
| 4,859,027 | * | 8/1989 | Kishida .............................. | 359/460 |
| 4,979,801 | * | 12/1990 | Park .................................. | 359/456 |
| 5,121,252 | * | 6/1992 | Okada et al. ....................... | 359/455 |
| 5,448,401 | * | 9/1995 | Takuma et al. .................... | 359/456 |
| 5,457,572 | * | 10/1995 | Ishii et al. .......................... | 359/457 |
| 5,870,224 | * | 2/1999 | Saitoh et al. ....................... | 359/456 |

FOREIGN PATENT DOCUMENTS 85 1 04899 A  4/1987 (CN) .

* cited by examiner

*Primary Examiner*—Christopher E. Mahoney
(74) *Attorney, Agent, or Firm*—Sughrue, Mion, Zinn, Macpeak & Seas, PLLC

(57) ABSTRACT

A projector screen is composed of a Fresnel lens for collimating incident light from a light projection device, a lenticular lens formed of a plurality of constituent lenses for forming and spreading an image from the parallel light, and a screen protection panel for protecting a screen set up adjacent to the lenticular lens. A projecting part of a predetermined height is formed on the rear side of the screen panel facing the lenticular lens, and on the tip of the projecting part a black stripe is formed to serve as a light-absorbing means. The height of the projecting part is lower than that of a convex surface of the lenticular lens. The widened range of light-spreading angle of the lenticular lens improves a horizontal viewing angle.

4 Claims, 3 Drawing Sheets

PROJECTOR SCREEN HAVING AN IMPROVED HORIZONTAL VIEW ANGLE

BACKGROUND OF THE INVENTION

1. Field of the Invention

The present invention relates to a projector screen used as an image-displaying medium, and more particularly to a projector screen having an improved horizontal view angle.

2. Description of the Related Art

The direct-view type screen of a conventional image-displaying means, for example, a television, uses a cathode-ray tube (CRT). For larger screens, however, the use of a cathode-ray tube is not practical because it is difficult to make a large CRT. Even if technical problems associated with making large CRTs could be overcome, the weight of a CRT also increases accordingly, so that it is difficult to transport and assemble a large CRT into a finished device. Therefore, an image projection system such as a projection television or video projector has been developed.

FIGS. 1 and 2 show two examples of a conventional image projection system. Such a system generates an image by using a specially manufactured small CRT 1 or image-displaying means 2 such as a liquid crystal display element or a polymer dispersed liquid crystal. Then, the generated image is amplified by using an optical lens, e.g., projection lens 3, for projection onto a large screen.

Conventionally, there are two types of image projection systems, i.e., a frontal-projection type projector (front type) and a rear-projection type projector (rear type). Typical rear-projection type projectors, such as those shown in FIGS. 1 and 2, have advantages in that they can be manufactured with a slimmer body than the frontal-projection type projector, and can provide a displayed image of better brightness.

The rear type projector is used for various kinds of apparatus such as a flight simulator, a traffic signal light, a video monitor, a microfilm reader, and a general rear-projection type display using a film medium for generating an image which can be observed by a user. These apparatus include a projector which generates an image on a screen by projecting light, from an image source situated behind the screen, along a projection axis to the front of the screen. A viewer is situated in front of the screen, and when there are many such viewers, the horizontal viewing angle must be large to allow all of the viewers to see a bright image. Also, it is desirable to have a large horizontal viewing angle so that a viewer can be situated at positions other than directly in front of the screen.

FIG. 3 is a schematic perspective view showing the cross-sectional structure of a screen for a conventional projector. To display an image of nearly uniform luminance over a wide viewing angle by deflecting the rays emitted from an image source, the screen is equipped with Fresnel lens 11 for generating parallel light by receiving the light magnified by a projection lens. In front of Fresnel lens 11, there are plural lenticular lenses 12 extending in parallel with one another (hereafter collectively called a lenticular lens system). The lenticular lens system serves as a light-spreading means for forming an image by spreading the parallel light passed through Fresnel lens 11. In front of the lenticular lens system, namely, at the viewer's side, is screen protection panel 13 of an acrylic material. Also, between the rear side of screen protection panel 13 and the front side of the lenticular lens system, projecting part 12a of a predetermined height is formed for absorbing part of light spread from a convex surface of the individual lenticular lenses 12. Projecting part 12a is formed by black stripes 12b painted with an opaque ink or the like formed between adjacent lenticular lenses 12 forming the lens system on the tip of projecting part 12a. This allows the contrast of the image formed in front of lenticular lens 12 to be improved.

However, in a conventional screen for a projector, projecting part 12a having black stripe 12b extends outward from the surface of the lenticular lens system so that a light-scattering angle of the individual lenticular lenses 12 of the lenticular lens system is limited. See FIG. 4. This limited light-scattering angle restricts the horizontal angle for viewing an image on the screen.

SUMMARY OF THE INVENTION

To solve the above problems, it is an object of the present invention to provide a projector screen having an improved horizontal viewing angle.

Accordingly, to achieve the above object, there is provided a projector screen comprising: a Fresnel lens for collimating incident light from a projection lens equipped in a light projection apparatus; plural lenticular lenses connected and extending in parallel with respect to one another for forming and spreading an image from the collimated light by the Fresnel lens; and a screen protection panel for protecting a screen installed adjacent to the lenticular lens, wherein the screen protection panel is equipped with light-absorbing means for absorbing light spread by the lenticular lens.

In the aforesaid screen for a projector according to the present invention, it is preferable that the light-absorbing means is a black stripe on the tip of a projecting part formed on the side of the screen protection panel facing each lens-connecting part of the lenticular lens, and the convex surface of each lenticular lens extends further toward the viewer than the black stripe formed on the projecting part which serves as the light absorbing means.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
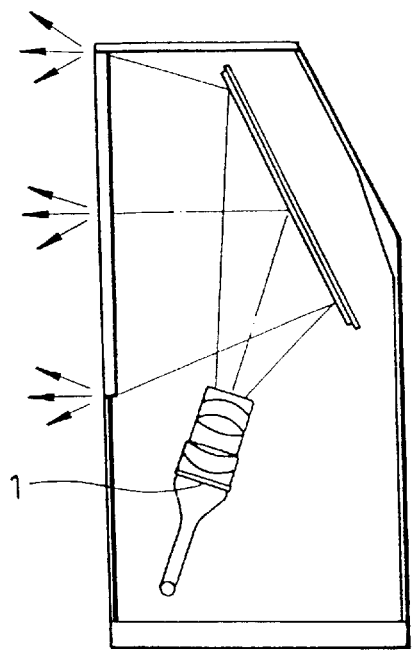
FIG. 1 is a schematic side view illustrating a conventional projection television of a rear-projection type adopting a small CRT.
Figure 2:
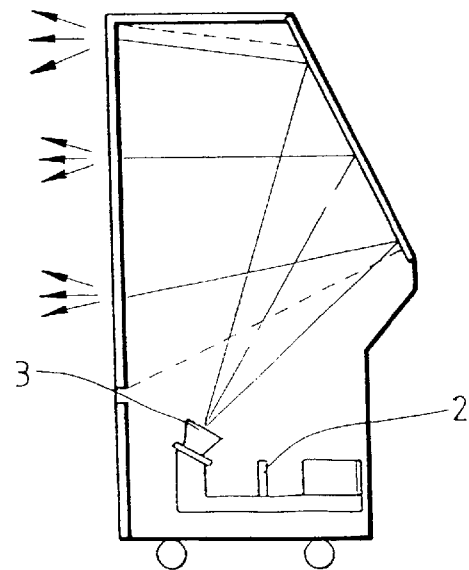
FIG. 2 is a schematic side view illustrating a conventional projection television of a rear-projection type adopting an image-displaying means.
Figure 3:
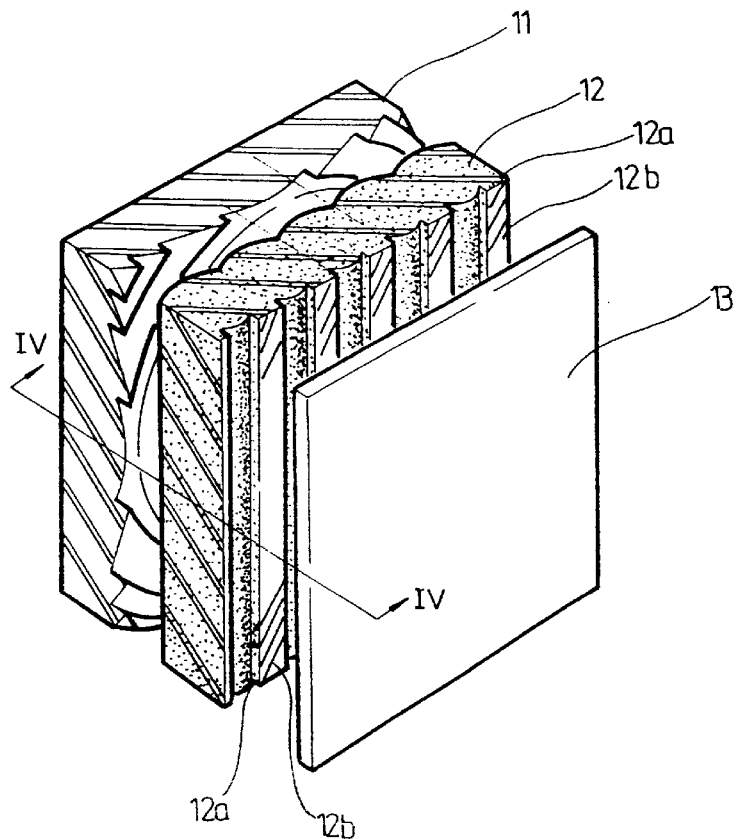
FIG. 3 is a schematic perspective view illustrating the structure of a conventional projector screen.
Figure 4:
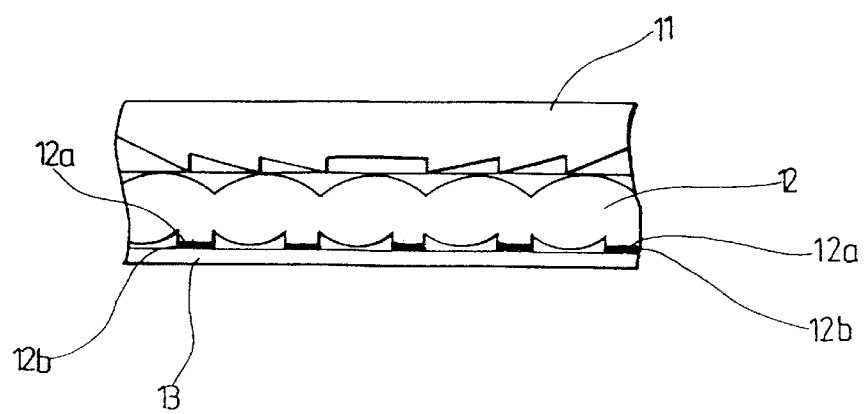
FIG. 4 is a cross-sectional plan view illustrating the projector screen shown in FIG. 3; taken along line IV—IV
Figure 5:
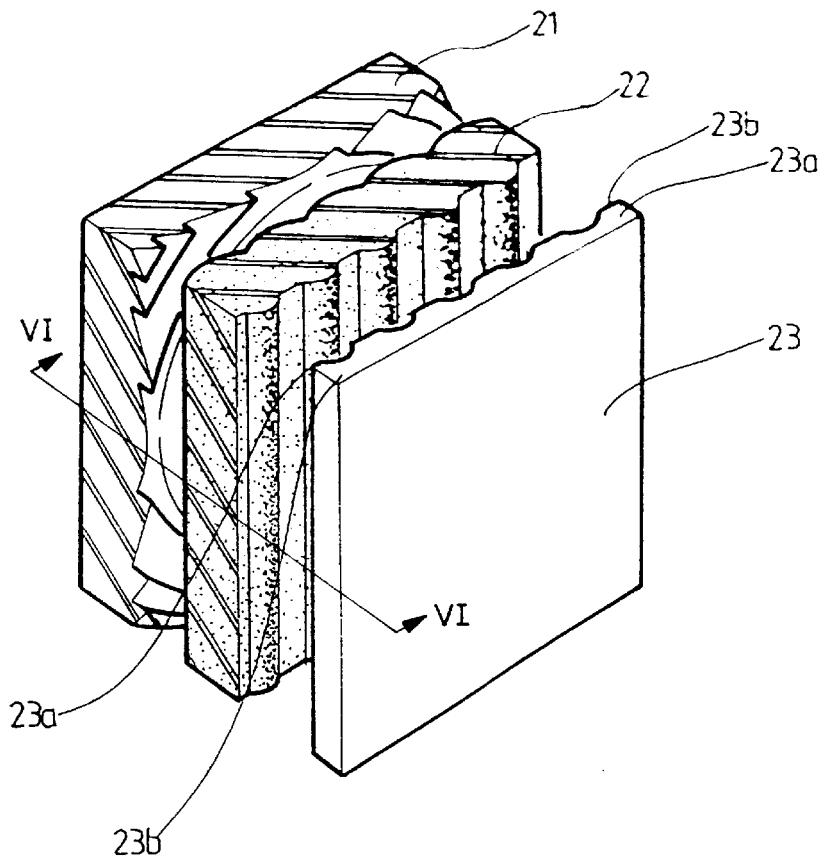
FIG. 5 is a perspective view schematically illustrating the structure of the projector screen according to the present invention by extracting a part of the apparatus.
Figure 6:
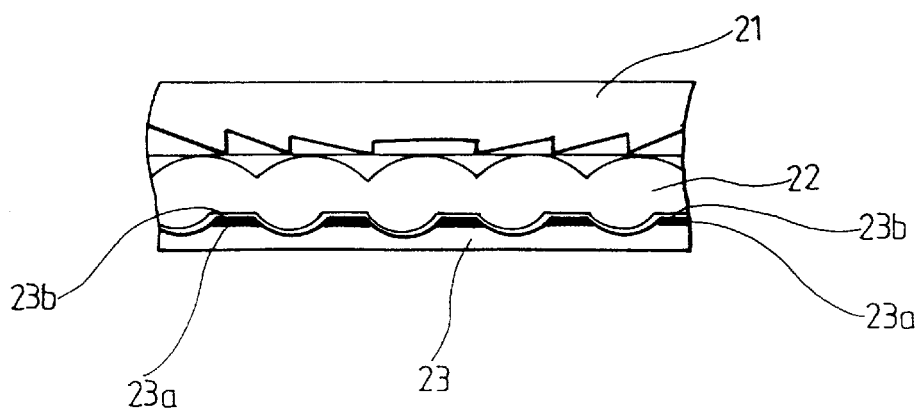
FIG. 6 is a cross-sectional view taken along the line VI—VI in FIG. 5.

FIG. 6 schematically shows the cross-sectional structure of a projector screen according to a preferred embodiment of the present invention. To display an image of nearly uniform luminance throughout a wide viewing angle by deflecting the rays emitted from an image source, the screen for a projector of the preferred embodiment is equipped with a Fresnel lens 21 for generating parallel light by receiving the light magnified by a projection lens in a projector. In front of Fresnel lens 21 is a lenticular lens system 22 having a plurality of constituent lenses serving as a light-spreading means for forming an image by spreading the parallel light emanated from the Fresnel lens 21. In front of the lenticular lens system 22, namely, on the viewer's side, is a screen protection panel 23 made of an acrylic material. On the side of screen protection panel 23 which faces each section where the constituent lenses are connected in the lenticular lens, a projecting part 23a of a predetermined height is formed. On the tip of projecting part 23a, a black stripe 23b is formed by black ink or the like. The black stripe serves as a means for absorbing part of the light spread from lenticular lens 22 to increase contrast of the viewed image.

In a projector screen having the aforesaid structure according to the present invention, the height of black stripe 23b is lower than that of a convex surface of lenticular lenses of lens system 22, so that the black stripe absorbs part of light spread by lenticular lens 22. In other words, the convex surfaces of the lenticular lenses extend in the viewer's direction beyond the black stripes 23. Because of this, the spreading angle of light emitted from the lenticular lens is not unduly limited. Therefore, the contrast of an image is improved, and a horizontal viewing angle is improved by the widened range of the light-spreading angle of the lenticular lenses of lens system 22.

What is claimed is:

1. A projector screen comprising:
    a Fresnel lens for collimating incident light from a projection lens equipped in a light projection apparatus;
    a lenticular lens system comprising a plurality of constituent lenses, extending in parallel with respect to one another, for forming and spreading an image from the collimating light by said Fresnel lens; and
    a screen protection panel disposed adjacent said lenticular lens system,
    wherein said screen protection panel is equipped with a light-absorbing means for absorbing light spread by said lenticular lens system, and
    further comprising a projecting part formed at a predetermined height on the side of said screen protection panel that faces said lenticular lens system, and wherein said light absorbing means comprises a darkened stripe formed on said projecting part.

2. The projector screen of claim 1, wherein convex surfaces of said lenticular lens system extend toward a viewing side to a greater degree than said stripe formed on said projecting part.

3. The projector screen of claim 2, wherein said light absorbing means further comprises a plurality of stripes formed on a plurality of corresponding projection parts, said projection parts being formed on the side of said screen protection panel that faces said lenticular lens, said projection parts opposing connecting sections of said lenticular lens that serve to connect a plurality of lens elements of said lenticular lens together.

4. The projector screen of claim 3, wherein said stripes are black.

* * * * *